3,022,343
SEQUESTRANT DERIVED FROM CORN SYRUP
AND PROCESS FOR MAKING THE SAME
Reinhold Behnke, Kenosha, Wis., assignor to Pfanstiehl Laboratories, Inc., Waukegan, Ill., a corporation of Illinois
No Drawing. Filed Nov. 17, 1959, Ser. No. 853,456
3 Claims. (Cl. 260—528)

This invention relates to methods of preparing sugar acids and more particularly to novel improvements in the preparation of sodium glucoheptonate syrups.

The sodium glucoheptonates have been found useful as chelating agents in compounding industrial products such as compositions for cleaning glassware and metals, paint-stripping compositions, boiler-scale removing compositions, radiator cleaners, germicidal compositions, and a wide variety of other adaptations involving the sequestration of metal ions. The sodium glucopheptonates were virtually unavailable commercially until recently. This was due primarily to the lack of a suitable method for the preparation on an economically feasible commercial scale of a product suitable for the aforementioned uses.

The Kiliani process which is representative of the classical procedure for converting sugars to sugar acids involves the use of hydrocyanic acid which is quite hazardous to handle on a large scale in a chemical plant. Moreover, the product of this reaction is found to be heavily contaminated with sugar degradation products resulting from the strongly alkaline medium produced by the ammonia formed during the conversion of the nitriles produced to the acids. Efforts undertaken to produce the desired sugar acids by the use of sodium cyanide in place of hydrocyanic acid have resulted in the formation of substantial quantities of sugar degradation products and the formation of dark colored syrups. This is particularly true when substances such as corn syrup have been employed as the starting material.

One of the objects of the present invention is to provide an improved process for the preparation of alkali metal sugar acid salts in syrup form from corn syrup, wherein the formation of carbohydrate degradation products is minimized and a high sequestering capacity for metal ions is achieved.

Another object is to provide a novel chelating composition from corn syrup.

A further object is to provide a novel method for preparing a chelating composition composed principally of sodium glucopheptonate and sodium aldobionate together with other components which in the composite gives rise to a substantially enhanced sequestering capacity in the composition.

Further objects will become apparent from the following description and examples.

Commercially available corn syrups are composed essentially of dextrose, maltose, higher sugars and dextrins. The proportions of these components may vary depending on the methods employed in manufacturing the corn syrup. The dextrose and maltose comprise the major portion of the syrup. Dextrose is an aldose and maltose is a disaccharide. The term "higher sugars" is intended to mean those sugars not falling within the collective group of aldoses and disaccharides. The term "sodium glucopheptonate syrup" is intended to embrace not only the sodium glucopheptonates formed in the reactions involved in the process of this invention but also in addition thereto the sodium salts of the sugar acids derived from all of the aldoses and disaccharides that may be present in the corn syrup.

According to the present invention, generally stated, an improved sodium glucoheptonate syrup is prepared by adding to an aqueous solution of corn syrup cooled to a temperature in the range of 0–30° C. and preferably at 0–20° C., the entire quantity of solid sodium cyanide stoichiometrically equivalent to the dextrose and disaccharide content, calculated as the glucose equivalent and agitating the reaction mixture until the sodium cyanide is completely dissolved. It has been found that when this procedure is practiced, the aldoses and disaccharides present in the starting material are reacted with the sodium cyanide before these sugars can be degraded by the alkali liberated by hydrolysis of the sodium cyanide. The reduced starting temperature of the reaction mixture is found to be essential in the control of the exothermic reaction which results during the conversion of the sugars to sugar acids. Once the conversion to sugar acids has taken place under these conditions, the alkaline condition of the reaction mixture does not appear to effect any substantial amount of degradation in the resulting solution.

Within 3–4 hours after the sodium cyanide is added, the reaction mixture is simultaneously aerated and heated to a temperature not in excess of 70° C. and maintained at that temperature until there is no trace of cyanide present in the mixture. Any suitable test for the presence of cyanide may be employed. An excellent test procedure has been found to be the Pagenstecher-Schonbein test. In this procedure, white filter paper is first impregnated with guaiac tincture and, after drying, with a 0.1% aqueous cupric sulfate solution. The paper is then dried again. This test paper is colored blue by cyanides. In addition to the Pagenstecher-Schonbein procedure (ref. Schaer, Meues Repert. Pharm. (3), 18,356; Zeitschr. Anal. Chem. 13, 761874); Sieverts-Harmsdorf, Zeitschr. Angew. Chem. 34, 3 (1921)), modifications have been reported (Sundberg, Svensk. Kem. Tid. 33, 112 (1921); Moir, J. Chem. Met. Mining Soc. S. Africa 10,342).

Following the removal of cyanide from the reaction mixture, the syrup is cooled to 25–30° C. The solids content, calculated as sodium glucopheptonate, may be adjusted as desired. For example, addition of water until the specific gravity of the resulting syrup is 1.17 will provide a syrup containing 35% solids. Vacuum evaporation of the syrup to a specific gravity of 1.35 will provide a syrup containing 70% solids. The product may then be placed in drums for shipment. The syrup produced by this process is light amber in color and possesses a high level of sequestering capacity for metal ions such as calcium, magnesium, iron, zinc and others. The alkalinity of the syrup is in the range of pH 7.5–10. For example, when 470 grams of a corn syrup containing 276 grams of total sugar solids, calculated as glucose, and including therein not only the monosaccharides consisting essentially of dextrose and the disaccharides such as maltose but also the higher sugars, is reacted with 80 grams of sodium cyanide, which represents the stoichiometric quantity for the glucose equivalent of the total sugar solids, the reaction product is quite dark in color. When, however, 60 grams of sodium cyanide are employed (representing the stoichiometric quantity for the glucose equivalent of the monosaccharides consisting of the aldose and the disaccharides), the reaction product is light amber in color. On the other hand, when 50 grams of sodium cyanide are employed (representing the stoichiometric quanitiy for the glucose equivalent of the dextrose content only of the starting material), the reaction product is substantially lower in sequestering capacity. Thus, the critical factor in this connection is the quantity of sodium cyanide stoichiometrically equivalent to the combined monosaccharide (dextrose) and the disaccharides (such as maltose) present in the starting material. When the quantity of sodium cyanide is too low to convert those sugar solids represented by monosaccharides and disaccharides into sugar acids, the unconverted portion of these sugars is degraded by the alkali in the reaction mixture.

Although by the method of this invention, the quantity of sodium cyanide employed is stoichiometrically equivalent only to the mono and disaccharides (i.e., the dextrose and maltose content of the corn syrup), the presence of the higher sugars and dextrins during the reaction period apparently has a highly beneficial effect upon the sequestering capacity of the resulting product, since substantially higher sequestering capacities are achieved with the product of this invention. That the dextrins and higher sugars must be present during the reaction period is apparent from the fact that the addition of dextrins and higher sugars to a sodium glucoheptonate syrup derived from cyanidization of dextrose alone invariably lowers the sequestering capacity of the resulting composition. Moreover, when the quantity of sodium cyanide employed is increased to become stoichiometrically equivalent to the dextrose, maltose and the higher sugars as well, the resulting product possesses a substantially reduced sequestering capacity, besides being much darker in color.

A representative analysis of a corn syrup serving as the starting material for the process of the present invention is shown in Table I.

TABLE I

| | |
|---|---|
| Dextrose, wt. percent | 27.2 |
| Maltose, wt. percent | 21.5 |
| Higher sugars, wt. percent | 10.0 |
| Dextrins, wt. percent | 22.0 |
| Total solids, wt. percent | 81.0 |
| Moisture, wt. percent | 19.0 |
| Gravity, degrees Baumé | 43 |
| Ash, wt. percent | 0.3 |
| pH | 5 |
| Viscosity, poises (100° F.) | 70 |
| Boiling point, ° F. | 229 |
| Weight, lbs. per gal. (100° F.) | 11.8 |

The following examples will serve to illustrate the improved process of the present invention.

*Example I*

To 250 gallons of cold water (5–20° C.) is added with agitation 2,250 pounds of corn syrup having the analysis shown in Table I. The resulting solution is usually at a temperature of 15–25° C. If higher, the solution is cooled to a temperature not in excess of 20° C. and preferably lower. To the resulting solution is added 300 pounds of sodium cyanide in egg form. This quantity of sodium cyanide is the stoichiometric amount required to satisfy the glucose equivalent for the dextrose and maltose present. The full amount of sodium cyanide is added at one time, or in other words as rapidly as possible. Agitation is continued until all of the sodium cyanide is in solution. The reaction is complete in 3–4 hours, as evidenced by the cessation of exothermic reaction. The temperature after cyaniding is usually about 35° C. or lower, depending upon the starting temperature. The reaction mixture may be allowed to stand overnight if desired, but this is not essential. It is of significance to observe that while 3–4 hours are required to complete the reaction, the initial reaction of the cyanide with the sugars appears to take place almost instantly. Upon completion of the reaction, the reaction mixture is simultaneously aerated and heated gradually to 70° C. Aeration and heating are continued until there is no trace of cyanide remaining in the solution, as evidenced by the Pagenstecher-Schonbein test described previously. For a sodium glucoheptonate syrup having 35% solids (i.e., total solids), water is added with agitation until the specific gravity is adjusted to 1.17. For a sodium glucoheptonate syrup having 70% solids, the solution is vacuum evaporated to a specific gravity of 1.35.

The sodium glucoheptonate syrup thus prepared is found to have a sequestering capacity of about 26 (measured as percent calcium ions sequestered per unit weight of sequestrant solids). This figure is substantially higher than that for a sequestrant prepared from dextrose by the same method, indicating that the presence of reacted maltose and the presence of the higher sugars and dextrins, even though the latter are unreacted with cyanide, in the sequestering syrup has an enhancing effect on the sequestering capacity of the reaction product. A comparable product made by the same method but using dextrose hydrate in place of corn syrup is found to have a sequestering capacity of about 21, which is substantially lower. Not only is the sequestering capacity of the product made from corn syrup by the method of this invention higher than that of a product made from dextrose, but in addition thereto, the quantity of cyanide required is substantially lower than for the product made from dextrose for the same quantity of end product. This is a decided economic advantage on a commercial scale. Moreover, inasmuch as sugar acid sequestering compositions are sold on the basis of the sequestering capacity per pound of solids, an increase in sequestering capacity of the order attained in the product of the present invention enhances its value substantially over that which is attainable when the total sugar solids (dextrose, maltose and also the higher sugars) are reacted with an amount of sodium cyanide equivalent to such total sugar solids.

*Example II*

A solution of 2,250 pounds of corn syrup having the analysis shown in Table I in 250 gallons of water is prepared and cooled by means of refrigerating coils to 0° C. To the solution is added 300 pounds of sodium cyanide in egg form in portions of 50 pounds each over a period of 60 minutes. The mixture is agitated until all of the sodium cyanide is in solution. The solution is then aerated and heated gradually to 70° C. and maintained at that temperature with aeration until the Pagenstecher-Schonbein test shows the absence of cyanide in the solution. Water is added until the specific gravity of the solution is 1.17 (35% solids). The resulting syrup is light amber in color. The sequestering capacity of the product is about 26.

*Example III*

A commercial corn syrup was employed having a moisture content of 18.9%, a solids content of 81.1% and containing the following components on a solid basis:

| | Percent by weight (solids basis) |
|---|---|
| Dextrose | 31.4 |
| Maltose | 28.1 |
| Higher sugars | 18.8 |
| Dextrins | 21.7 |

In each of three Erlenmeyer flasks were placed 440 grams of the above corn syrup (containing about 360 grams of solids). The syrup was dissolved in 1200 cc. of water having a temperature of about 25° C. Solid sodium cyanide was added to each flask in the following amounts:

| | Grams |
|---|---|
| Flask No. 1 | 80 |
| Flask No. 2 | 60 |
| Flask No. 3 | 50 |

The mixtures were stirred until the cyanide was dissolved. After standing overnight at room temperature, the flasks were aerated and simulaneously heated to 70° C. After about 5 minutes, the cyanide disappeared in flask No. 3 and after two hours in flask No. 2. Flask No. 1 did not give a negative test for cyanide until after several hours of boiling. Flask No. 2 represents the practice of the process of the present invention wherein the quantity of sodium cyanide was sufficient stoichiometrically to react with the dextrose and maltose content of the syrup. Flask No. 1 represents the prior practice wherein the quantity of sodium cyanide was sufficient stoichiometrically to react with the dextrose, the maltose and also the higher sugars in the syrup. The quantity of sodium cyanide in flask No. 3 was insufficient to react with all of the dextrose and maltose in the syrup. The chelation capacity in grams of calcium ion per gram of sequestrant on a solids basis was determined and the results were as follows:

| | Chelation capacity ($Ca^{++}$/gram) |
|---|---|
| Flask No. 1 | 23.3 |
| Flask No. 2 | 25.7 |
| Flask No. 3 | 18.4 |

It will be observed that the flask No. 2 test wherein the amount of sodium cyanide was sufficient to react with the dextrose and maltose content of the syrup had an 11% greater chelation capacity than the flask No. 1 test wherein the amount of sodium cyanide was sufficient to react with the dextrose, the maltose and also the higher sugars in the syrup. The product in flask No. 2 had a 27% higher chelation capacity than the product in flask No. 3 wherein the amount of sodium cyanide was insufficient to satisfy the dextrose and the maltose content of the syrup.

The term "corn syrup" as used in this application is intended to embrace partial and total hydrolysates of starch wherein the principal components are dextrose, maltose, higher sugars and dextrins.

This application is a continuation-in-part of my copending application Serial No. 715,216, filed February 14, 1958, now abandoned.

Others may practice use of the invention in any of the numerous ways which will be suggested to one skilled in the art upon a reading of this specification. It is intended that all such practice of the invention be included hereunder provided it falls within the scope of the appended claims.

I claim:
1. The method of preparing a sequestrant for calcium and other ions from corn syrup comprising adding rapidly in a single portion to an aqueous solution of corn syrup having an initial temperature in the range of 0–30° C. a quantity of solid sodium cyanide stoichiometrically equivalent to the combined dextrose and maltose content of said corn syrup, calculated as glucose, maintaining the reaction mixture until the sodium cyanide is dissolved and the reaction is complete, aerating and gradually heating the reaction mixture to 70° C., and maintaining said aeration and temperature until traces of cyanide are absent in the solution.

2. The process of claim 1 wherein the initial temperature of the aqueous corn syrup solution is in the range of 0–20° C.

3. A sequestrant derived from corn syrup by adding rapidly in a single portion to an aqueous solution of corn syrup having an initial temperature in the range of 0–30° C. a quantity of solid sodium cyanide stoichiometrically equivalent to the combined dextrose and maltose content of said corn syrup, calculated as glucose, maintaining the reaction mixture until the sodium cyanide is dissolved and the reaction is complete, aerating and gradually heating the reaction mixture to 70° C., and maintaining said aeration and temperature until traces of cyanide are absent in the solution.

References Cited in the file of this patent
UNITED STATES PATENTS
2,606,918   Isbell _____ Aug. 12, 1952

OTHER REFERENCES
Rupp et al.: Archiv der Pharmazie, Vol. 251, pages 553–556 (1913).
Hudson et al.: J. Am. Chem. Soc., Vol. 56, pages 1248–1249 (1934).